United States Patent [19]
Hardison

[11] Patent Number: 5,788,201
[45] Date of Patent: Aug. 4, 1998

[54] ARTICLE HANGERS

[75] Inventor: Stewart Hardison, Bainbridge, N.Y.

[73] Assignee: Perky-P Co., Denver, Colo.

[21] Appl. No.: 414,386

[22] Filed: Mar. 31, 1995

[51] Int. Cl.[6] .................................................. A47H 1/16
[52] U.S. Cl. ........................ 248/302; 248/303; 24/20 R
[58] Field of Search ................................. 248/302, 112, 248/315, 62, 74.1, 304, 305, 339, 303; 24/369, 373, 716, 20 R, 23 R, 20 EE, 20 S, 30.5 T, 22, 546, 547, 598.2

[56] References Cited

U.S. PATENT DOCUMENTS

| 509,529 | 11/1893 | Harris . | |
|---|---|---|---|
| 771,905 | 10/1904 | Germain | 248/302 |
| 1,219,702 | 3/1917 | Childress . | |
| 1,472,766 | 10/1923 | Fraser | 24/369 |
| 3,122,803 | 3/1964 | Boggess et al. | 24/598.2 |
| 3,234,616 | 2/1966 | Wantland | 24/237 |
| 3,604,066 | 9/1971 | Moon | 24/30.5 R |
| 3,657,909 | 4/1972 | Boswell | 70/457 |
| 4,133,509 | 1/1979 | Kalbow et al. | 248/315 |
| 4,847,957 | 7/1989 | Ranta | 24/237 |
| 4,909,466 | 3/1990 | Matthews | 248/303 |
| 5,309,865 | 5/1994 | Hardison | 119/57.8 |

FOREIGN PATENT DOCUMENTS 853558  11/1960  United Kingdom ............... 24/546

Primary Examiner—Alvin C. Chin-Shue
Assistant Examiner—Anita M. King
Attorney, Agent, or Firm—Richard G. Stephens

[57] ABSTRACT

An article hanger or keeper comprises a wire formed as a major portion of one turn of a geometric solenoid with two hook end portions having bent-back ends which include bends of approximately $\pi$ radians (180°) around a radius approximating the diameter of the wire, to provide hangers which may be used singly or in series. The hangers are easy for a human to install and lock or unlock, without a need for any auxiliary tool, but very unlikely to become accidentally unlocked. One disclosed embodiment utilizes a slightly elliptical turn, which renders the hanger self-orienting to deter one type of accidental unlocking.

8 Claims, 4 Drawing Sheets

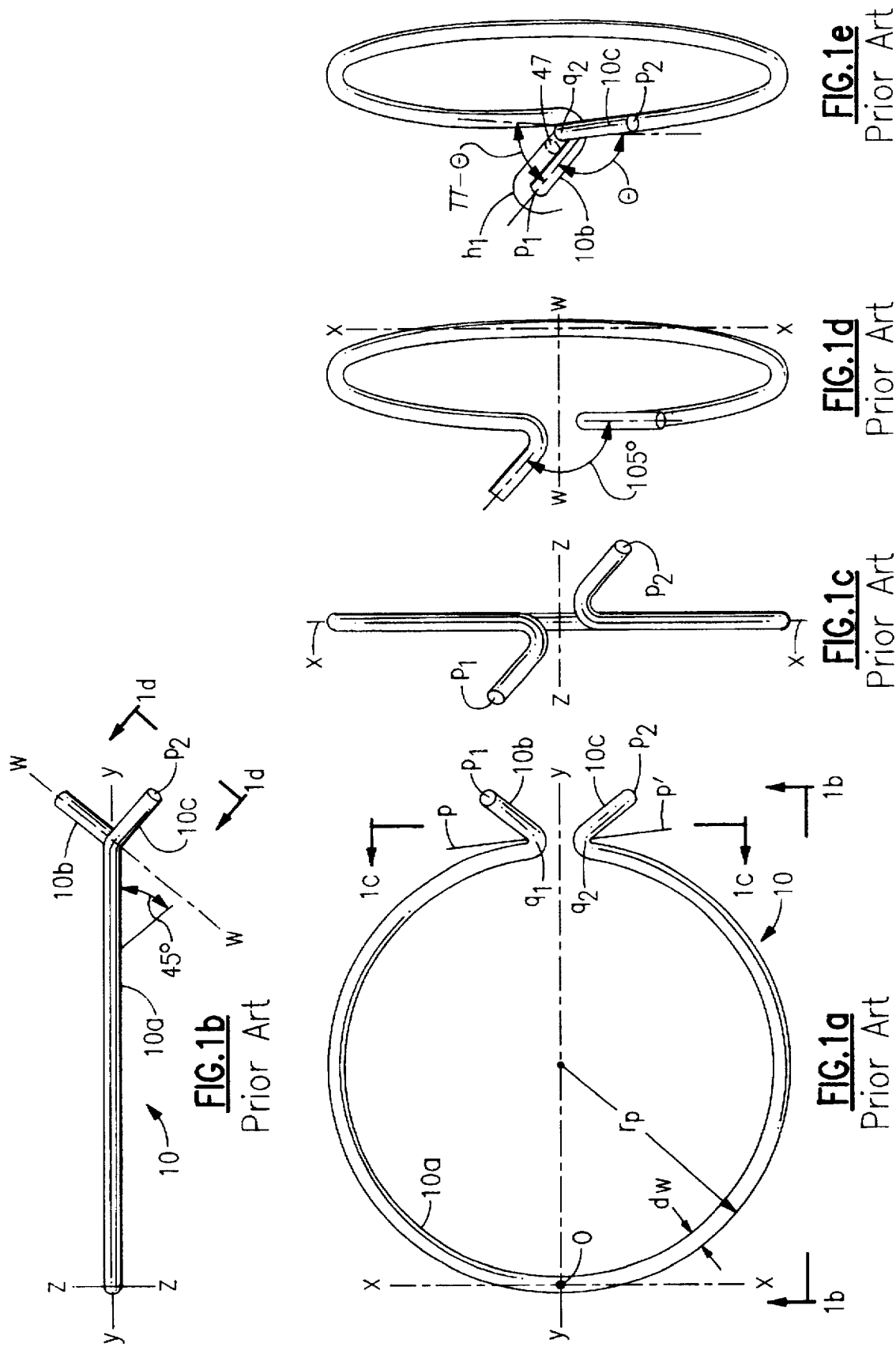

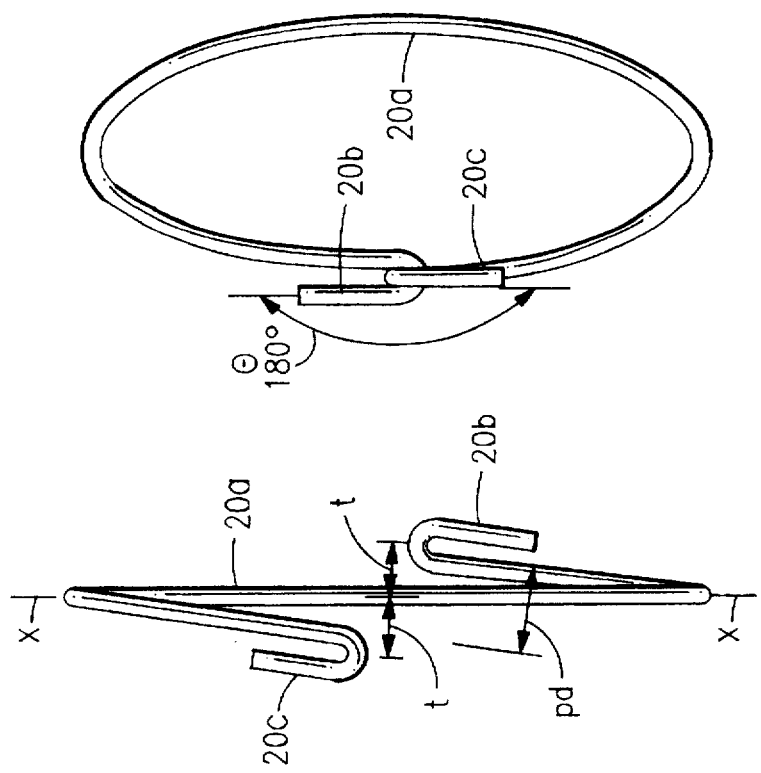
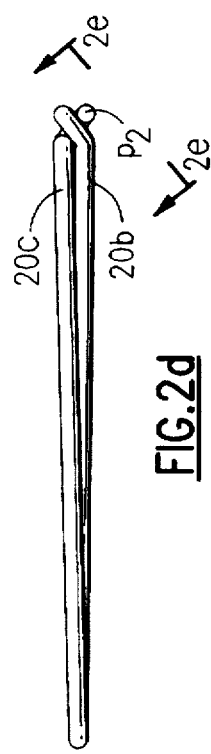
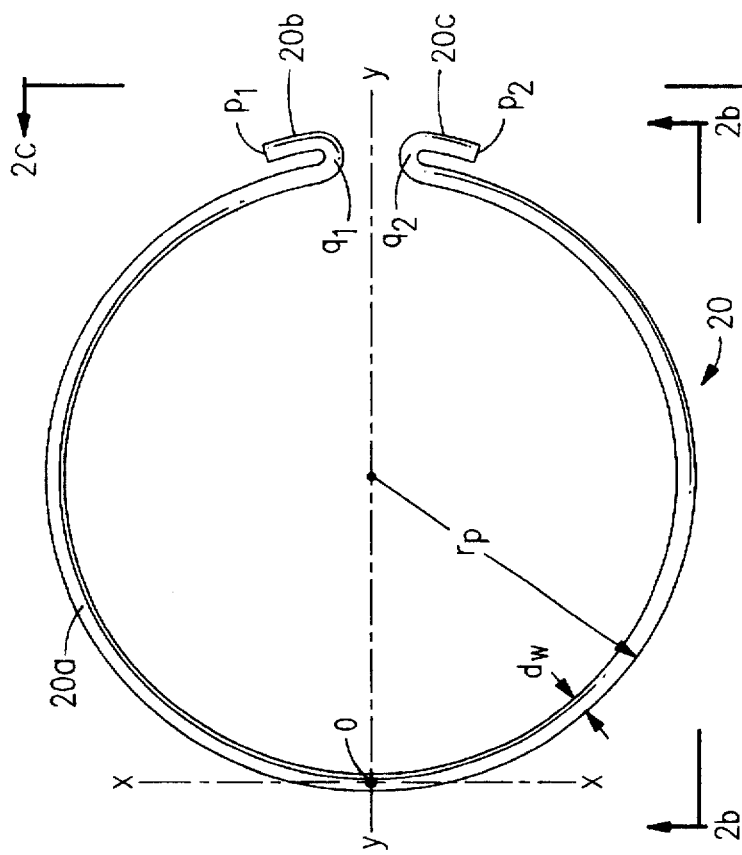
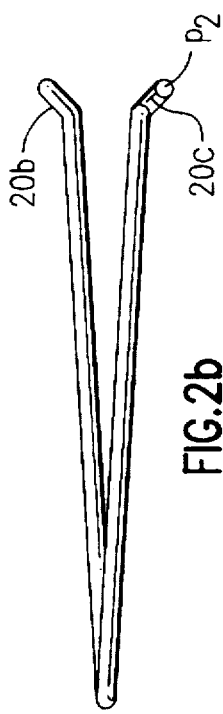

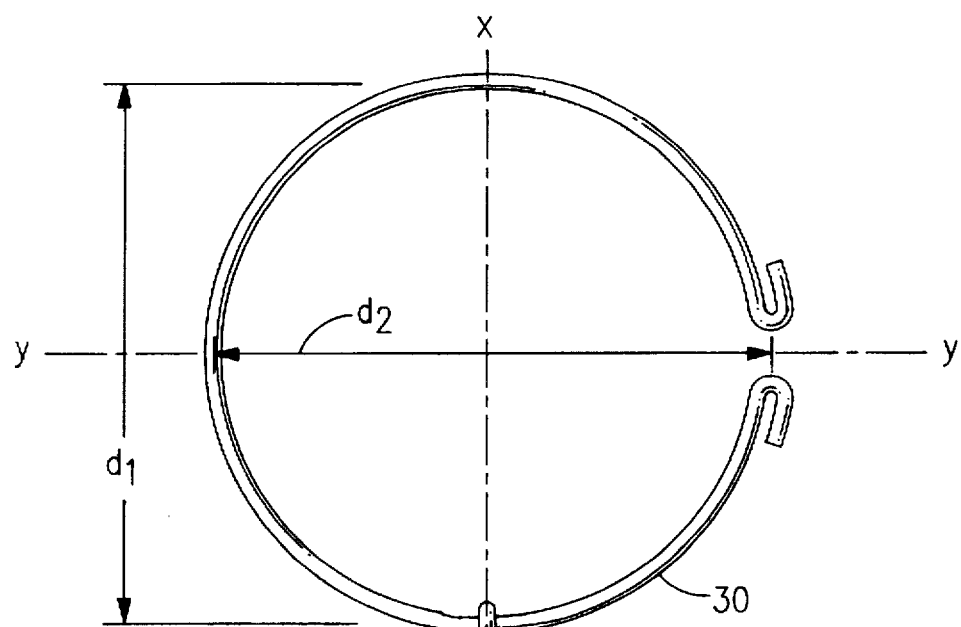
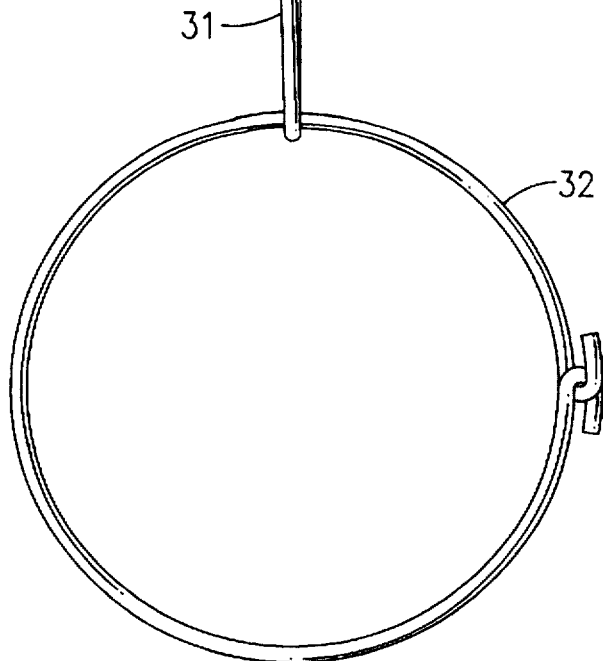
FIG.3

5,788,201

1

ARTICLE HANGERS

BACKGROUND OF THE INVENTION

My invention relates to article hangers, and more particularly, to hangers used around a home, garden or yard by consumers to hang such items as kitchen pots, bicycles, wind-chimes, birdfeeders, flower baskets, camp lanterns and other objects, and to hangers used in industrial environments to hang such items as tool buckets, paint buckets, electrical cord, conduit for cable and pipe, lighting fixtures and other objects. The invention is believed to be especially suitable for hanging bird feeders and bird houses. The terms "hang", "hanging", "hanger" and cognate terms are used herein to refer to a suspension of one or more articles which will thereafter allow the one or more articles to swing to some appreciable degree.

DISCUSSION OF THE PRIOR ART

Two types of hanging devices which come to mind are widely used to hang some of the above-mentioned articles, one of which hanging devices comprises an oversize S hook having a top partial-loop portion which can hook over a tree limb or an overhead timber or the like, and a bottom partial-loop portion serving as a hook on which things may be hung. Another common type of hanging device comprises a specialized bracket which attaches to a tree, post, sidewall or the like, and employs a protruding arm on which various objects may be hung. Both of these types of hanging devices have a number of disadvantages, one important disadvantage being that neither is a closure device which can securely capture an object which suspends from it. That deficiency allows various animals to dislodge hanging objects, often causing damage to the objects or pilferage of their contents. Even when S hooks are specially designed to thwart animals, as suggested by U.S. Pat. No. 4,887,785, they still can be dislodged by large intelligent animals such as raccoons and bears.

A prior form of hanging device which I have made, and which has numerous advantages over the above-discussed prior art, comprises a single metal rod bent into a generally circular or ring shape, with bent portions at its ends arranged to overlap and grip each other in a manner which will be discussed below in detail. When the two ends are so engaged, the device may be considered to be "locked" in the sense that no object or objects applying force outwardly on the inside of the ring can move to outside the ring, assuming the force is not so great that it will break the rod. Because such a ring can be readily "locked" and "unlocked," it becomes feasible to chain plural such rings together, allowing one to create a hanging system which can be lengthened in modular fashion. While my prior ring hanging device has proven to be useful and advantageous for many purposes, in some applications it suffers from one or more deficiencies which the present invention is designed to overcome.

To be suitable for many uses, a ring-type hanging device must be capable of being locked and unlocked in a simple manual manner by persons of limited physical strength, dexterity, and mechanical skill, without a need for any type of key, or other special tool which can be mislaid or lost. One important object of the present invention is to provide a hanging ring device which is not only suitable in those respects, but which is also extremely unlikely to become unlocked, even in various freak circumstances.

The invention accordingly comprises the features of construction, combinations of elements, and arrangement of parts, which will be exemplified in the constructions hereinafter set forth, and the scope of the invention will be indicated in the claims.

SUMMARY OF THE INVENTION

An article hanger comprises a wire formed as a major portion of one turn of a geometric solenoid with two hook end portions having bent-back ends which include bends of approximately $\pi$ radians (180°) around a radius approximating the diameter of the wire, to provide hangers which may be used singly or in series. The hangers are easy for a human to install and lock or unlock, without a need for any auxiliary tool, but very unlikely to become accidentally unlocked or unlocked by animals. One disclosed embodiment utilizes a slightly elliptical turn, which renders the hanger self-orienting to deter one type of accidental unlocking.

BRIEF DESCRIPTION OF THE DRAWING

FIGS. 1a and 1b are side and end views, respectively, of my prior art hanger ring shown in an unsprung or relaxed condition, and FIG. 1c is a view taken at lines 1c—1c in FIG. 1a. Given a trio of orthogonal axes, FIG. 1a shows an xy view, FIG. 1b a yz view, and FIG. 1c an xz view.

FIGS. 1d is a view of the prior hanger ring of FIGS. 1a–1c taken at lines 1d—1d in FIG. 1b, and showing what may be termed an xw view. The xw view is shown fixed at an acute angle of 45 degrees with respect to the xy view of FIG. 1a, and at an angle of 45 degrees with respect to the yz view of FIG. 1b.

FIG. 1e is a view of the prior ring taken in the same direction as FIG. 1d, but with the ring moved to a locked position so that its end portions are linked.

FIGS. 2a and 2b are side and end views, respectively, of one preferred embodiment of my invention, and FIG. 2c is a view taken at lines 2c—2c in FIG. 2a. Given the previously mentioned trio of orthogonal axes, FIG. 2a shows the xy view, FIG. 2b the yz view, and FIG. 2c the xz view.

FIG. 2d is a view of the ring of FIGS. 2a–2c which is similar to FIG. 2b but with the ring shown in the locked condition.

FIG. 2e is a view of taken at lines 2e—2e of FIG. 2d, in a view xw which is canted 45 degrees with respect to the xy view and the yz view.

FIG. 3 is a diagram illustrating, and useful for understanding, one possible modification to the present invention.

DETAILED DESCRIPTION

Figure 1G:
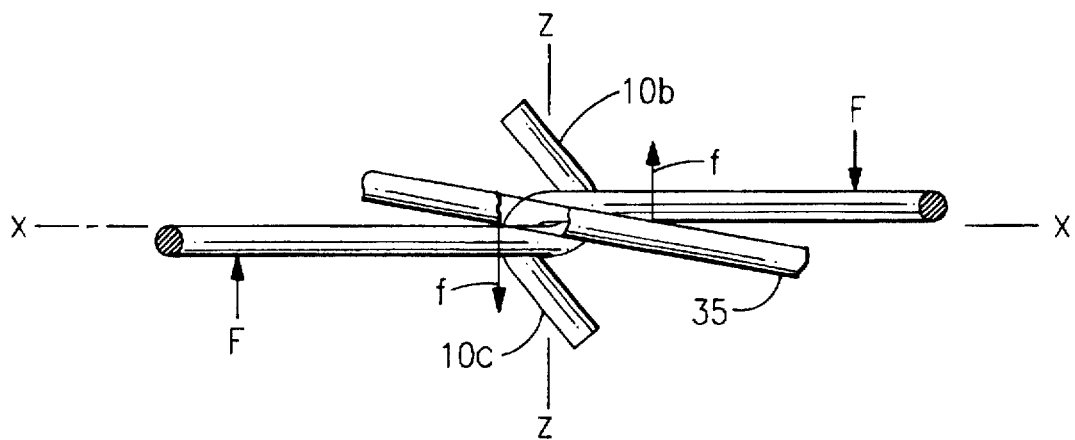
FIG. 1g is a partial cross-section view taken at lines 1g—1g in FIG. 1f.

FIGS. 1a, 1b and 1c are three views of the prior art device taken with that device positioned relative to a trio of orthogonal axes, x, y, and z, with the device shown in a unsprung or relaxed unlocked condition. Referring to those views, it will be seen that the prior art hanger comprises a single piece 10 of rod of circular cross-section with a diameter $d_w$, with a major central portion 10a of the rod formed to follow a generally circular path shown in FIG. 1a as having a radius $r_p$. It may be noted from FIG. 1b that all the circular portions of rod 10 lie in the same plane. Rod 10 has two end portions 10c and 10b which are bent from the circular path to provide "hook" or "end" portions which may be releasably locked together by the user. The points at which hook portions 10b, 10c join the substantially circular portion 10a of the ring are labelled q1 and q2, and will be referred to for convenience as "bend" points. As shown in FIG. 1b, hook ends 10b and 10c are shown bent at an angle β from the y axis, with β shown having a value of 45°. In FIG. 1d hook end 10b is shown bent back at an angle θ as viewed in the xw plane. In FIG. 1c hook end 10c is shown bent back at the same angle θ. As previously indicated, FIGS. 1a–1d show the prior device in an unsprung, unlocked, or relaxed condition or shape, with the hook ends separated. In FIG. 1d the circular portion of ring 10 appears elliptical, of course, when viewed at lines 1d—1d in FIG. 1b.

Both the prior art device and the improved devices to be described are ordinarily formed from a length of cylindrical steel rod, of Type ASA 1010, for example. In order to "lock" the device, the user must first force the end portions 10c,10b generally toward each other, working against the resilience of the substantially circular portion 10 of the rod, and slightly temporarily deforming that portion from its unsprung substantially circular shape. After those ends have been forced sufficiently close to one another, the user must move them in a second relative direction toward and then past each other along one or the other of two general paths. Then finally, with the hook ends maintained within a range of positions, the user must relax, release and eventually remove any force from the ring, allowing it to return by sake of its resilience toward, but not all the way to its unsprung, or relaxed circular condition, with the two hook ends 10c, 10b eventually grasping each other as shown in FIG. 1e. The two general paths of movement, both of which lead toward the locked condition, involve, in relation to FIG. 1a, movement of point q1 around point P2, or conversely, movement of point q2 around point P1. Movement to unlock the hanger similarly occurs along one or the other of the same two general paths. In order to simplify the description, movement along only one of the allowable paths will be considered henceforth, except as otherwise explicitly stated.

After locking, the device later may be unlocked by use of a generally reverse procedure. It is necessary for practical utility, of course, that the forces required to "lock" and "unlock" such a device not be excessive. It is also highly desirable that "unlocking" be essentially unable to occur without an intelligent procedure both unlikely to occur randomly in nature and outside the mental grasp of most small animals.

Figure 1F:
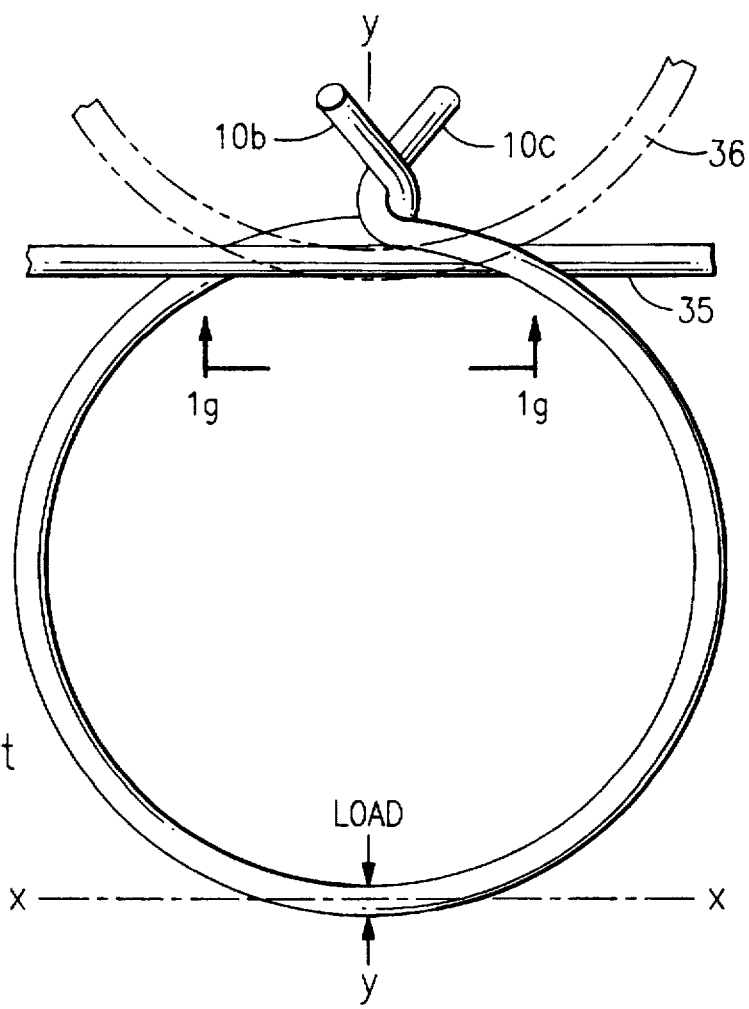
FIG. 1f is a side view diagram of a prior art ring with portions of several possible supporting members shown, this diagram being useful for explaining a failure problem sometimes associated with some prior art ring hangers.

If rings of the type described are hung in series, with the lowermost ring carrying a load, such as a bird house, any forces, such as wind, which cause the load to tend to rotate about a vertical axis, result in force couples being applied to various of the rings in the z direction, as exemplified by forces F,F in FIG. 1g. Such forces, even when very small, can cause the prior art ring to fail to an unlocked condition under some circumstances, as may be better understood by reference to FIGS. 1f and 1g. In FIG. 1f ring 10 is shown locked around a fixed support rod 35, or alternatively, as shown in dashed lines, around another ring 36, with either rod 35 or ring 36 having a rod diameter generally similar to the ring 10 rod diameter. If ring 10 is oriented so that its ends lie near support rod 35, the small cross-section of rod 35 can cause resultant forces F,F (FIG. 1g) to be applied in the z direction to ring 10, quite near the bend points q1,q2 of that ring, temporarily spreading the ends of ring 10 so that rod 35 or ring 36 can slip through. While such circumstances can cause the prior art hanger undesirably to "unlock", with much surprise to the user, hangers constructed in accordance with the present invention are impervious to such failure. In accordance with the present invention such failures may be deterred or prevented by either one or both of two techniques, one of which involves appropriate shaping of the hook ends of each ring, and the other of which involves use of a slightly elliptical form in the geometrical solenoid portion of a hanger ring, as will be explained in detail below.

Some theoretical equations set forth below aid in giving some insight into the magnitudes and directions of various forces involved as hanger rings of the general type described are locked and unlocked. Equations (1)–(6) express the displacements of a defined point on the ring which result in three directions as forces which are translational (i.e., not torsional) having components in one or more of those directions, are applied to a semi-circular portion of a ring. In FIG. 1a circular portion 10a of ring 10 can be considered to comprise beam portions each extending from a respective end assumed to be secured at origin O, the intersection of the x and the y axes, to a respective "bend point", q1 or q2, at which a respective force, P or P', is applied, as indicated by a respective arrow in FIG. 1a. Points q1 and q2 are actually located at the center of the wire. In formulating equations (1) to (6) it is assumed that bending of the metal rod occurs in accordance with Hooke's law, with no resultant permanent deformation, and the small displacements occurring from non-permanent deformation are neglected in defining the action of the forces. With those simplifying assumptions, the strain energy of such a system may be given by a homogeneous function of the second degree in terms of the acting forces, thus allowing use of The Theorem of Castigliano to define the displacement (δ) resulting from forces (P) applied to points on the ring in the same plane and direction as the displacement. It is further assumed that, because the diameter of the rod $d_w$ is much less than the radius $r_p$ of the ring, the forces and the resulting displacements may be deemed relative to the center line of the rod, and since displacements are small relative to radius $r_p$, small angle approximations may be used. Equations (1)–(3) are equations expressing with integrals the displacements δx, δy and δz of point (q) along the x,y, and z axes, respectively, of a point (q1 or q2) at the upper end of a semi-circular rod element which result as forces Px, Py, and Pz are applied to that point of the rod element. Equations (4)–(6) are integrated versions of equations (1)–(3) respectively, expressing those displacements after integration from 0 to Π. Integration from 0 to Π gives a displacement value for an entire (180 degree) portion of a ring. In most hanger rings each half of the ring will extend for slightly less than 180 degrees, resulting in some inaccuracy in the exact magnitudes given by the equations, but not seriously impeding an understanding of the nature of the phenomena involved. If desired, integration may be done over a lesser range, such as 175 degrees, for example, for a ring in which the endpoints q1,q2 are 10 angular degrees apart in the relaxed condition, to determine the displacements of points q1 and q2 toward each other as the ring is compressed toward a locked condition. It should be pointed out, and should become clear from a judicious study of equations (1) to (3), that forces in the x plane produce displacements in the y plane and vice versa.

$$\delta_{qx} = \frac{r_p^3}{EI_z} \int_0^\pi [P_x(1 + \cos\phi)P_y \sin\phi](1 + \cos\phi)d\phi \tag{1}$$

-continued $$\delta_{qy} = \frac{r_p^3}{EI_z} \int_0^\pi [P_x(1+\cos\phi) + P_y \sin\phi]\sin\phi \, d\phi \quad (2)$$

$$\delta_{qx} = \frac{r_p^3}{EI_x} \int_0^\pi [P_z \sin^2\phi + (1+\sigma)P_z(1+2\cos\phi+\cos^2\phi)]d\phi \quad (3)$$

$$\delta_{qx} = \frac{r_p^3}{EI_z} \left( \frac{3\Pi}{2} P_x + 2 P_y \right) \quad (4)$$

$$\delta_{qy} = \frac{r_p^3}{EI_z} \left[ 2P_x + \frac{\Pi}{2} P_y \right] \quad (5)$$

$$\delta_{qx} = \frac{\pi r_p^3}{2 EI_x} P_z[1 + (1+\nu)3\Pi] \quad (6)$$

As forces are applied to move the pair of bend-points $q_1$ and $q_2$ toward each other in the x direction in FIG. 1a, the displacement $\delta_{qx}$ of the points in the x direction will each vary as described by equation (1), wherein E is Young's Modulus, $I_z$ is the moment of inertia of the ring cross-section about the z axis, $\nu$ is Poisson's ratio, $P_x$ is the component of any force vector P acting in the x direction, and $P_y$ is the component of any force vector P acting in the y direction. The moment of inertia $I_z$ about the z axis equals $\Pi d_w^4/64$, the moment of inertia $I_x$ about the x axis equals $\Pi d_w^4/32$, Young's Modulus equals $30 \times 10^6$ psi for common steel, and Poisson's ratio $\nu$ is approximately 0.3. Equations (2) and (5), and equations (3) and (6), similarly express the displacement versus force relationships in the other two orthogonal directions. While FIG. 1a shows forces P and P' applied at bend-points q1 and q2 in FIG. 1a for sake of analysis, in actual practice the forces applied to "lock" the ring would more likely be applied at plural poorly defined points along the sides of the ring by the user's hands, rather than at bend-points q1 and q2, of course. End points p1 and p2 are deemed to move in fixed relationship to bend-points q1 and q2, a justified assumption if one regards hook or end portions 10b and 10c to be rigid. The hook portions may be deemed without appreciable error to be essentially rigid because they are very short compared to ring portion 10a. Equations (1) to (6), assuming no torsional moments, apply to displacements at points $q_1$ and $q_2$ when translational forces are applied to points q1 and q2, but not to displacements at, nor to forces applied to other points on the ring. A very complicated set of equations is required to generally describe the force/displacement characteristics of such rings. The equations are as applicable to the improved rings of the present invention as to the prior art ring.

When ring 10 has been locked, the hook ends are urged together in the x direction with the amount of spring force $P_x$ that would be necessary to move the ends between the locked and the relaxed conditions. From equations (4) to (6) one can calculate how much x force had to be applied to the two sides of ring portion 10a to move those sides to the relative (in x) locked position shown in FIG. 1e (as they were being moved past such a position on their way to being locked, i.e. before they were released), and therefore know, very nearly, or exactly, the forces which are pulling those hook portions left and right during the locked condition shown in FIG. 1e. With the hook ends slightly offset from the xy plane of rod portion 10a, the hook ends can be seen to push against each other with a small force in the z direction. In the locked condition ends 10b and 10c are each moved very slightly, i.e., one-half the rod diameter, in the z direction from the unsprung condition. From equation (6) one can determine those ends push against each other with a given pair of z forces during the locked condition. The magnitude of that pair of z forces is very modest, however. It will become clear as the description proceeds, that a vastly greater pair of forces produced in hangers of the present invention contributes to considerably more secure locking.

Now we will discuss the forces which must be applied in order to unlock ring 10. In order to unlock ring 10 it is necessary, of course, that the hook ends move to a position at which they no longer grasp each other. That will occur, for example, if the ring is compressed sufficiently by some fortuitous or accidental force, that point p1 can move around point q2, or so that point p2 can move around point q1, i.e., so that the apex of one hook end passes around the point of the other hook end.

From FIG. 1e, an xw view, it can be seen that when the device is locked, if an external force is applied which tends to move either or both bend points q1 and q2 away from each other, those bend points are not free to move in all directions, but rather, as viewed in FIG. 1e, constrained to occur within angle (Π-θ). If hook end 10c is forcibly moved from the locked position shown in FIG. 1e so that its apex approaches point p1 on hook end 10b, but remains within the angle (Π-θ), any release of force on hook end 10c will allow that hook end to snap back to the locked condition in geodesic fashion. Conversely, if hook end 10c is moved out of the (Π-θ) range, as around point p1, for example, a release of that hook end will result in it snapping to the unlocked position in geodesic fashion. A point of indeterminacy exists when the apex of the hook end is situated at the point of the other hook end of the ring. If released at the point of indeterminacy, a hook will snap fortuitously, or with an infinitesimal urging, to either a locked or unlocked condition.

The external forces applied during "unlocking" or "locking" can be resolved into force components $P_x$, $P_y$ and $P_w$. Importantly, the effects of these component forces are related to the angle θ at which the rod ends are bent back from the ring in the w plane. In the case of the mentioned prior art the bend-back angle θ was selected to be equal to 105°. In practical operating environments the external forces in the x direction necessary for "unlocking" seldom occur accidently.

In the locked position the elastic forces on point q1 are equal and opposite to those on point q2. Also, and the points q1 and q2 are "constrained" on the one side by the ring 10a and on the other side by the end portions 10b and 10c. To "unlock" ring 10, one must move apex point q1 of hook end 10b around end point p2 of the other hook end 10c, or instead move apex point q2 of hook end 10c around end point p1. In FIG. 1e assume external forces applied to unlock the ring result in forces w,x and y acting at points q1 and q2. As previously explained, external forces in the y direction are only of interest in that they can produce displacement in the x direction. Apex point q2 of hook end 10b can be moved along the x axis (upwardly as viewed in FIG. 1e) by application of an increasing force, the magnitude of which may be calculated by equation (4), but apex point q2 cannot move downwardly in FIG. 1e without a force which is catastrophic in magnitude and need not be considered. Movement of apex point q2 somewhat in the w direction (leftwardly as viewed in FIG. 1e) as well as simultaneously in the upward x direction is obviously one proper procedure which may lead to unlocking. It is important to understand the various forces involved as one urges the apex point with a component of motion in the w direction, and important to note that such forces depend very much on the bend-back angle θ, which has been 105° in the prior art devices.

A user who wishes to unlock the ring can maneuver the q2 apex point along a path around point p1 such as that shown in dashed lines at h1 in FIG. 1e, and during such movement hook end 10c need not "rub" on or against hook end 10b. However, such maneuvering requires intelligent coordination. Insofar as accidental or unintended unlocking is concerned, combinations of forces of the types required to move along path h1 are extremely unlikely to occur. However, forces which act principally in the w direction can frequently occur in nature; as, for example, those forces previously discussed above in connection with FIGS. 1f and 1g, and in these cases the forces involved are affected by frictional effects. Thus both intentional unlocking and accidental unlocking require forces to overcome the residual elastic forces which urge the hook ends together during the locked condition, but accidental unlocking involves, in addition, important frictional forces.

If a portion of hook end 10c engaging hook end 10b as indicated by dashed-line circle 47 in FIG. 1e is urged in the w direction by a force Fw, a component Fn of that force acts perpendicularly to hook end 10b, and the magnitude of that component is given by:

$$Fn = Fw \sin(\theta - 90) \tag{7}$$

Similarly, another component Fp acting parallel to the direction in which the hook end extends is given by:

$$Fp = Fw \cos(\theta - 90) \tag{8}$$

The frictional force Ff opposing force Fp to limit motion along the hook end 10b is given by:

$$Ff = \mu Fn \tag{9}$$

where $\mu$ is the coefficient of friction. The parallel force $F_p$ (equation 8) must exceed the friction force $F_f$ (equation 10) if movement is to occur to the unlocked range of positions. A further force component Fx acting in the x direction is also present in order to "unlock" the device, of course.

In one model of the prior art hanger of FIG. 1e, wherein the bend-back angle $\theta$ was made equal to 105°, the normal force Fn becomes equal to 0.259 Fw, the parallel force Fp becomes equal to 0.966 Fw, and the frictional force thereby becomes equal to 0.259 $\mu$ Fw. It can be seen now, that even if the coefficient of friction is the theoretical maximum ($\mu$=1.00), the parallel force Fp will always be larger than the frictional force Ff. Hence the application of sufficient force in the w direction alone can undesirably produce an unlocked condition, even assuming an actually-unrealizable coefficient of friction, and with smaller, actually realizable coefficients of friction, the prior art hanger can open even more easily.

While I prefer article hangers having a bend-back angle of 180° for most applications, for reasons which will become clear below, I have discovered that simple modifications made to the prior art hanger of FIG. 1a can markedly increase the reliability of that hanger, and other embodiments of article hangers having bend-back angles in the range of 150° to 180°. By simply providing substantial friction between the ends of the article hanger, such a hanger can be made effectively foolproof using a wide variety of bend-back angles. Using a bend-back angle of 150°, one may discern by reference to equations (7) to (9) that the normal force Fn then will equal 0.866 Fw, and the parallel force Fp will equal 0.5 Fw. If the coefficient of friction $\mu$ is 0.6, by way of example, then the frictional force Ff will equal 0.52 Fw. Under such circumstances the frictional force Ff will always exceed Fp. As a result, a force occurring in the w direction alone will never produce an accidental unlocked condition. Hence it is within the scope of the invention to provide improved hanger rings in which bend-back angles within 150 and 180 degrees are used together with frictional engagement such that the coefficient of friction equals or exceeds 0.6. Those skilled in the art will recognize that the friction coefficient may be so established using any one of a wide variety of known techniques, such as roughened or knurled surfaces.

However, I prefer the embodiment of the invention shown in FIGS. 2a–2e, wherein the bend-back angle $\theta$ equals 180°. With that arrangement, the normal force Fn (equation 7) will always equal the applied force component Fw, and importantly, the parallel force Fp (equation 8), which now must act in the x direction, will be zero. Thus the improved hanger of FIGS. 2a–2e can not be accidentally unlocked by the application of simple w-direction forces, regardless of the frictional conditions. In order to "unlock" the article hanger of FIG. 2a–2e, one must sequentially apply first a sufficient force in the proper x direction, and then thereafter a force having a w component. Such sequential operations are not within the mental capabilities of most small animals. The longer the slot provided by the bent-back end, the smaller the probability that an accidental first force will relatively displace the hanger ends enough that a second accidental force will result in "unlocking", but the stronger the user then must be in order to "lock" and "unlock" the hanger. In most applications of the preferred embodiment of the invention, I prefer that a length of approximately four times the diameter $d_w$ of the rod extend to provide each end portion.

It is ordinarily desired that the "slot" provided by each 180° bend-back have a width slightly exceeding the rod diameter, so that the hook ends may be slid apart and together with no appreciable wedging.

Referring to FIG. 2c, it may be seen that in its relaxed or unsprung condition thereshown, the central substantially circular portion 20a of ring 20 does not lie in a "flat" circle, but rather is wound with a pitch, so that the slots of hook ends 20b, 20c lie substantially displaced from the x axis thereshown, at distances both shown as t in FIG. 2c, and so that the "pitch" of the rod is dimension pd. Thus the "circular" portion 20a of ring 20 which carries hook ends 20b, 20c in FIGS. 2a–2e is shown having a form believed in classical geometry to be that of a geometrical solenoid. With hook ends 20b, 20c separated at substantial distance 2t in the w direction in the unsprung or relaxed condition, substantial force is required to hook the hook ends together in order to lock the hanger, but more importantly, as the hanger lies locked, a considerably greater force is required in the w direction in order to unlock the hanger, since an opposite force equal to that required to lock the device must be imposed in the w direction before the apex of either hook end will even begin to move along the shank portion of the other hook end. In practical applications it is easy to increase the required amount of force by a factor of say 4 or 6 by merely spreading the hook ends to provide the 2t distance shown by way of illustration in FIG. 2c. Thus if the central portion of the wire hanger is a geometrical solenoid rather than a uni-planar geometric circle, the locked position advantageously provides an added bias forces which act against unlocking.

The article hanger ring shown in FIGS. 2a–2e preferably is constructed of steel wire having a diameter of 0.25 inch, with ring diameters of the order of eight inches or larger, with each endpiece having a bend-back angle of approximately 180°, and with the slot width (dimension sw in FIG. 2e) exceeding the covered (painted) outside diameter of the wire by say 0.002 in. When making rings which are smaller than approximately eight inches in diameter I prefer to use wire of a lesser diameter, such as wire 0.205 in. in diameter. Rings may be made in accordance with the invention in a wide range of sizes. Various specialized rings, such as key rings, or rings to keep fishing lures, as examples, may be a small as one inch in diameter, while other rings may be as large as 18 inches. The latter may be hung over barn rafters and used to hang horse blankets, for example. While the "slots" formed by the bent ends 20b and 20c are shown as having a uniform width (dimension sw in FIG. 2e), it is within the scope of the invention to forms such slots with varying widths, thereby requiring even more complex sets of forces to be applied to such rings in order to unlock them.

In FIG. 3 ring 30 thereshown is constructed exactly like ring 20 of FIGS. 2a–2e, except that it is made slightly elliptical, with its dimension $d_1$ along axis x exceeding (preferably by 5 to 15 percent) distance $d_2$ measured parallel to the y axis. A similar ring 31 is shown suspended from and linked with ring 30, and a similar third ring 32 is shown suspended from ring 31. It may be noted that in each ring the minor axis of the ellipse is shown coinciding with the y axis at the vertical location at which the ends of the ring "lock" together. It is not necessary that the minor axis have exactly such a location, but it is desirable. With any appreciable load suspended from slightly-elliptical ring 30, it should become clear upon reflection, that a portion of the weight of such a load provides a component of force which acts to angularly orient ring 30 toward the position shown, so that the major axis extends substantially vertically and the minor axis extends substantially horizontally. Notably, the hook ends of each elliptical ring tend to lie half way up such rings, rather than at the tops or bottoms of such rings, and most importantly, away from where such rings engage a support rod or a supporting ring, or any other rings suspended from such rings. With such an arrangement, wind, animals, or a variety of forces may temporarily disturb ring 30, but the force of gravity, acting on a load suspended from that ring, will always tend to maintain the locked ends joint of the ring substantially halfway up one side of the ring. With the locked end joint located at such a position, it will be seen that application of a twisting "unlocking" couple, or a rod-to-ring or ring-to-ring connection of the nature discussed above in connection with FIGS. 1g and 1h could not be applied to the locked end joint except under extremely fortuitous circumstances. It is altogether possible to make ring 30 more elliptical, i.e. to provide a greater major/minor axis ratio than 1.20, but I prefer to limit the ratio to 1.2 in ordinary applications of the invention in order that such rings appear to the naked eye basically as circles. While it is within the scope of the invention to make hanger rings having the slightly elliptical shape with end hook bend-back angles less than 150 degrees, it is much preferred that such rings also have the Π radian (180°) bend-back angles like the ring shown in FIGS. 2a to 2e. Further, it is not necessary that the geometrical solenoid configuration (exemplified by distance 2t in FIG. 2c) be used with rings having the Π radian bend-back angles, but it is deemed generally desirable.

Though the articles of the invention have been termed "hangers", it is important to note that in a broader sense they may be deemed "keepers". For example, they may be used to capture a plurality of objects such as keys, not to hang the keys, but to maintain them assembled together, and in the following claims the term "hanger" is used in that broader sense.

It will thus be seen that the objects set forth above, among those made apparent from the preceding description, are efficiently attained, and since certain changes may be made in the above construction(s) without departing from the scope of the invention, it is intended that all matter contained in the above description or shown in the accompanying drawing shall be interpreted as illustrative and not in a limiting sense.

I claim:

1. An article hanger for temporarily suspending one or more articles, said hanger being capable of ready deliberate locking and unlocking and selectively usable in a chained fashion with one or more hangers or the like to support an article at a selected elevation, said article hanger comprising a metal wire having a central portion and a pair of end portions, said metal wire formed to approximate substantially one turn of a geometric solenoid when said ends are disconnected, one of said ends being bent at an angle outwardly and in a first axial direction from a plane containing said central portion formed when said pair of ends are connected together, and the other of said end portions being bent at an angle outwardly and in an opposite axial direction from said plane formed when said pair of ends are connected together, said end portions extending at said angle in mutually-opposite directions and each of said end portions being bent back toward a respective end of said central portion at an angle exceeding 0.75 π radian, whereby the ends of said hanger are prevented from unlocking when opposing forces are placed on said hanger's central or end portions and whereby said geometric solenoid shape permits ease of locking and unlocking.

2. The article hanger according to claim 1 wherein said end portions are each bent back toward a respective end of said central portion at an angle of substantially Π radians (180°).

3. The article hanger according to claim 1 wherein said wire has a circular cross-section and said central portion has a diameter exceeding 20 times the diameter of said wire.

4. The article hanger according to claim 1 wherein said central portion departs from a substantially circular configuration to be slightly elliptical, having major and minor axes, said minor axis intersecting said central portion at substantially the mid-point of said central portion.

5. The article hanger according to claim 1 wherein the length of at least one of said bent-back end portions lies between two to ten times the diameter of said metal wire.

6. The article hanger according to claim 1 wherein said wire has a circular cross-section and a diameter and the length of at least one of said bent-back portions substantially equals the diameter of said metal wire.

7. The article hanger according to claim 2 wherein said wire has a circular cross-section and a diameter and in which, when said end portions are not engaging each other and the hanger lies free in a relaxed condition of said hanger said end portions are spaced apart in a direction normal to said central portion by a distance exceeding four times the diameter of said metal wire.

8. The article hanger according to claim 4 wherein the length of said major axis is between 100 and 120% of the length of said minor axis.

* * * * *